United States Patent [19]

Shibata et al.

[11] Patent Number: 5,909,289
[45] Date of Patent: Jun. 1, 1999

[54] FACSIMILE APPARATUS CAPABLE OF PERFORMING DATA COMMUNICATIONS WITH COMPUTER AND CONTROLLING METHOD THEREOF

[75] Inventors: Koichi Shibata; Masakazu Oyama; Mitsuhiro Nakamura; Toshihiro Mori, all of Osaka, Japan

[73] Assignee: Mita Industrial Co., Ltd., Osaka, Japan

[21] Appl. No.: 08/751,443

[22] Filed: Nov. 18, 1996

Related U.S. Application Data

[63] Continuation of application No. 08/345,439, Nov. 21, 1994, abandoned.

[30] Foreign Application Priority Data

Nov. 24, 1993 [JP] Japan .................................. 5-293636

[51] Int. Cl.$^6$ ............................ H04N 1/32; H04N 1/00
[52] U.S. Cl. ........................ 358/468; 358/434; 358/403; 358/440
[58] Field of Search ..................................... 358/400, 402, 358/403, 407, 434, 435, 436, 438, 439, 440, 468

[56] References Cited

U.S. PATENT DOCUMENTS 4,652,933  3/1987  Koshiishi ................................ 358/434
5,091,790  2/1992  Silverberg ............................. 358/434
5,224,156  6/1993  Fuller et al. ........................... 358/438
5,274,467  12/1993  Takehiro et al. ....................... 358/440

FOREIGN PATENT DOCUMENTS 496190   7/1992   European Pat. Off. .
2214032  8/1989   United Kingdom .

OTHER PUBLICATIONS

Patent Abstracts of Japan, vol. 008, No. 139 (E–253), Jun. 28, 1984.

*Primary Examiner*—Thomas D. Lee
*Attorney, Agent, or Firm*—Rabin, Champagne & Lynt, P.C.

[57] ABSTRACT

The present invention provides a facsimile apparatus and controlling method, in which a confidential box number for PC transmission function for sending received information to a personal computer (15) is preliminarily registered. When a facsimile correspondence accompanying the confidential box number for PC transmission function is received, a control section (1) sends out the received information to an interface (10). Thus, the facsimile apparatus can distinguish information to be destined for the personal computer (15) from other received information to automatically send the information to the personal computer (15) by utilizing a confidential communication function thereof.

14 Claims, 3 Drawing Sheets

FACSIMILE APPARATUS CAPABLE OF PERFORMING DATA COMMUNICATIONS WITH COMPUTER AND CONTROLLING METHOD THEREOF

This application is a continuation of application Ser. No. 08/345,439, filed Nov. 21, 1994, now abandoned.

BACKGROUND OF THE INVENTION

1. Field of the Invention

The present invention relates to a facsimile apparatus capable of performing data communications with information processing apparatus such as a personal computer, and controlling methods thereof.

2. Description of the Prior Art

A function of carrying out a direct facsimile transmission of a document prepared by means of a personal computer and receiving image data transmitted from a facsimile apparatus via a telephone line is referred to as PC-FAX. To realize the PC-FAX function, a personal computer is connected through a fax modem having a facsimile communication function to a telephone line or, alternatively, connected to a facsimile apparatus having a data communication interface such as RS-232C.

An operation of taking information received by a facsimile apparatus into a personal computer is as follows. First, the operation mode of the facsimile apparatus is switched from an ordinary operation mode to a PC-FAX mode. The PC-FAX mode can be set by sending an instruction in a form of a control command called AT command from the personal computer. In the PC-FAX mode, information received in accordance with a facsimile communication procedure is sent to the personal computer. On the other hand, information received in the ordinary operation mode is printed out in a printer section of the facsimile apparatus.

In the aforementioned conventional facsimile apparatus having the PC-FAX function, whether received image data is printed out by the printer section of the facsimile apparatus or is sent to the personal computer is determined based on the operation mode of the facsimile apparatus, i.e., whether the operation mode is the ordinary operation mode or the PC-FAX mode. That is, the facsimile apparatus does not have a function of judging, when receiving information, whether the received information is to be sent to the personal computer or printed out in the printer section. Therefore, if a facsimile correspondence is to be received by a recipient facsimile apparatus in the PC-FAX mode, a transmitter has to tell a receiver to switch the operation mode of a recipient facsimile apparatus to the PC-FAX mode before carrying out a transmission operation.

Conventionally, such a situation makes the facsimile receiving operation through the PC-FAX function extremely inconvenient.

SUMMARY OF THE INVENTION

To solve the aforesaid technical difficulty, it is an object of the present invention to provide a facsimile apparatus which can distinguish and extract information to be sent to an information processing apparatus such as a personal computer from other received information, and send the extracted information to the information processing apparatus.

In accordance with one aspect of the present invention, there is provided a facsimile apparatus comprising an information output section for outputting information to an external information processing apparatus, and a facsimile functional section for receiving a facsimile correspondence including identification information indicative of whether or not the received facsimile correspondence is destined for the information processing apparatus, wherein the received facsimile correspondence is sent from the information output section to the information processing apparatus when the received facsimile correspondence accompanies identification information indicating that the received facsimile correspondence is destined for the information processing apparatus.

In detail, the facsimile apparatus of the present invention judges if the received facsimile correspondence accompanies identification information indicating that the received facsimile correspondence is to be sent to the information processing apparatus and, if yes, automatically sends the received facsimile correspondence to the information processing apparatus.

DETAILED DESCRIPTION OF THE PREFERRED EMBODIMENTS

Figure 1:
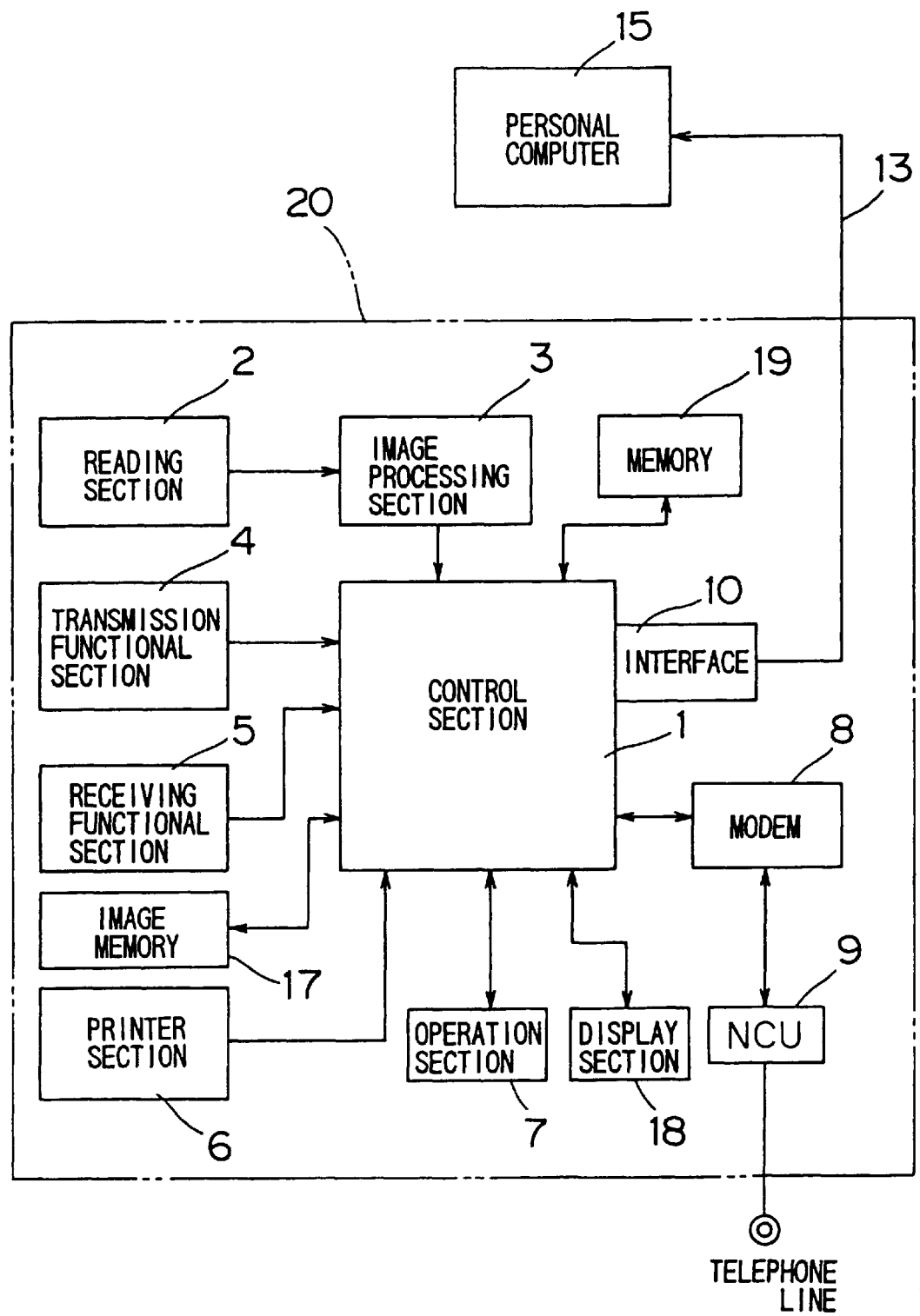
FIG. 1 is a block diagram illustrating an electrical construction of a facsimile apparatus according to an embodiment of the present invention to which a personal computer is connected.

FIG. 1 is a block diagram illustrating an electrical construction of a facsimile apparatus according to an embodiment of the present invention. A facsimile apparatus 20 comprises a control section 1 including such members as a personal computer which is adapted to receive image data sent from an image processing section 3. The image processing section 3 performs a predetermined image processing such as a gray-scale image processing on output signals of a reading section 2 which optically reads a document original to be transmitted, so as to prepare image data. To the control section 1 are connected a transmission functional section 4 for encoding image data by way of a predetermined encoding method and generating a control signal required for facsimile communications, a receiving functional section 5 for decoding received codes into image data and implementing a predetermined receive controlling procedure, a printer section 6 for printing such information as a received image on a paper sheet, an operation section 7 having such elements as a keyboard, a display section 18 including elements such as a liquid crystal display device, an image memory 17 for storing received image data transmitted through so-called confidential communications, and a memory 19 for storing confidential box numbers which will be described later. The control section 1 is connected to a telephone line via a modem 8 and network control unit (NCU) 9.

The control section 1 has an interface 10 for data communication such as RS-232C. The interface 10 serves as an information output port, and enables the control section 1 to be connected to a personal computer 15 of an external information processing apparatus via a communication cable 13.

With this arrangement, the personal computer 15 can control the facsimile apparatus 20 by way of so-called AT commands to carry out facsimile communications through the facsimile apparatus 20, thereby realizing a so-called PC-FAX function.

More specifically, the operation mode of the facsimile apparatus 20 is first switched from an ordinary operation mode to a PC-FAX mode. When the personal computer 15 sends a call-out command, phone number and transmission information to the interface 10 via the communication cable 13, the control section 1 calls out a recipient terminal via a telephone line. After the line connection is established, the control section 1 sends out to the telephone line the transmission information input to the interface 10. On the other hand, when the personal computer 15 sends to the control section 1 a control command instruction to stand by for receiving information in the PC-FAX mode, the control section 1 sends received information to the personal computer 15 via the interface 10 in response to a call-in.

In the ordinary operation mode, data is not transmitted between the facsimile apparatus 20 and personal computer 15. Accordingly, signals indicative of information of a document original read by the reading section 2 are sent to a telephone line, while image data received from a telephone line is printed out in the printer section 6. In this embodiment, when a facsimile correspondence destined for the personal computer 15 is received even in this ordinary operation mode, the received information can be sent to the personal computer 15 via the interface 10, which will be described later.

In addition to the aforesaid PC-FAX function, the facsimile apparatus 20 according to this embodiment has a so-called confidential communication function. In confidential communications, image data received from a telephone line is once stored in the image memory 17. When a predetermined password is input from the operation section 7, the image data stored in the image memory 17 is output. Therefore, those other than a user knowing the password can not see the received image.

A storage area of the image memory 17 has a plurality of memory areas for receiving confidential correspondence, so that a plurality of users can respectively utilize the confidential communication function. These memory areas for receiving confidential correspondence are called confidential boxes which have respective confidential box numbers assigned thereto. These confidential box numbers and the corresponding passwords are preliminarily registered in the memory 19 by operating from the operation section 7.

When carrying out confidential communications, a transmitter inputs a confidential box number. This allows a facsimile apparatus on the side of the transmitter to insert a control signal indicative of the confidential box number into facsimile communication procedure signals. When a facsimile correspondence having such a control signal is received, the control section 1 stores image data of the received correspondence in the confidential box corresponding to the confidential box number indicated by the control signal.

A function of distinguishing information destined for the personal computer 15 from other information received in the ordinary operation mode and automatically sending out the information to the interface 10 (hereinafter referred to as "PC transmission function") is realized by utilizing the aforesaid confidential communication function. This function will be detailed below with reference to FIG. 2.

Figure 2:
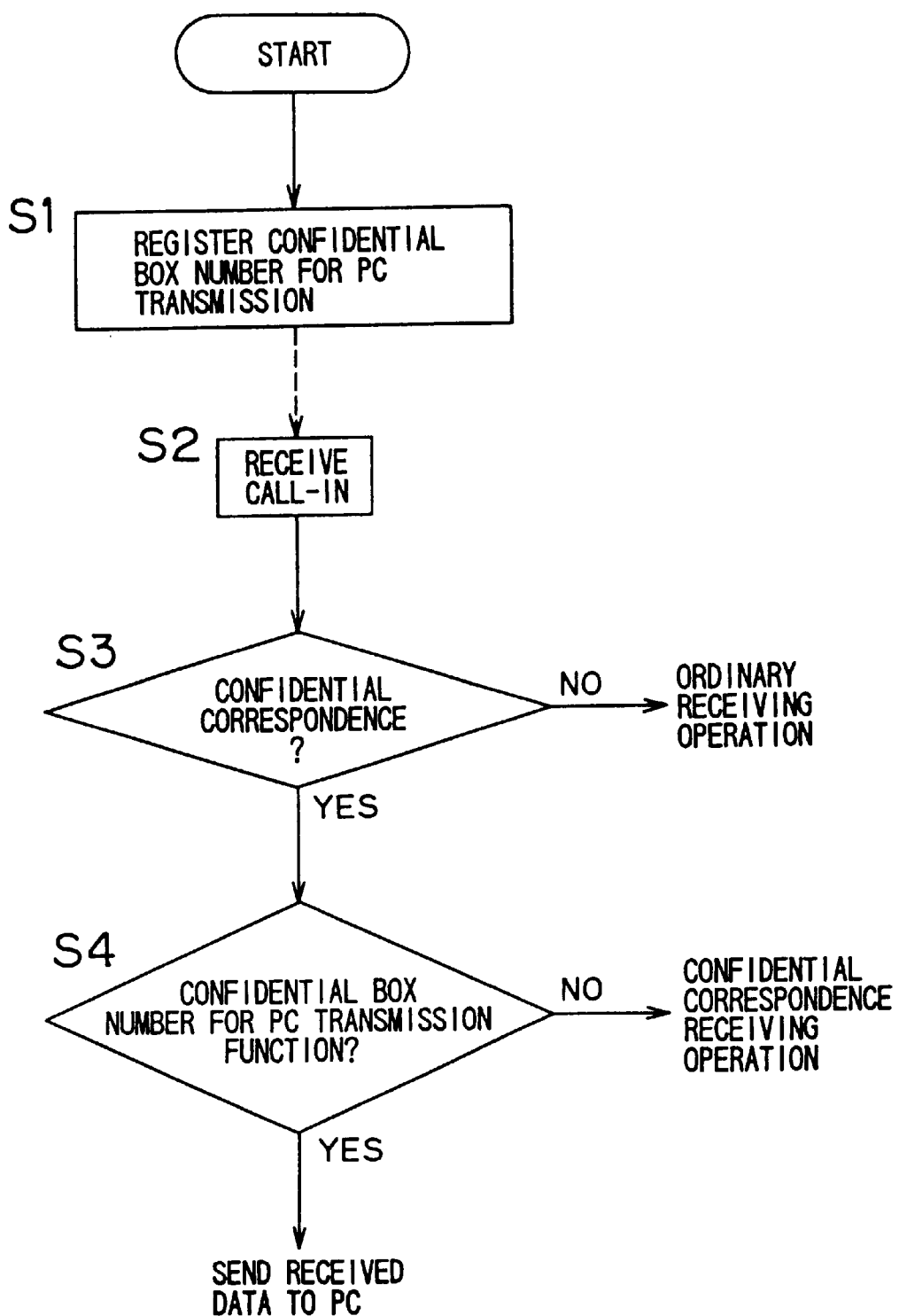
FIG. 2 is a flow chart for explaining the operation of a facsimile apparatus according to an embodiment of the present invention.

FIG. 2 is a flow chart for explaining the operation of the facsimile apparatus 20 in the ordinary operation mode. First, a confidential box number for the PC transmission function is registered (step S1). Provided that there already exist, for example, five confidential boxes "No. 1" to "No. 5" in the image memory 17, a confidential box number for a confidential box "No. 6" which has no entity is registered for the PC transmission function in step S1. Accordingly, there is no need to allocate a memory area to the confidential box corresponding to the confidential box number for the PC transmission function in the image memory 17.

When a facsimile correspondence is received (step S2), the control section 1 judges if the facsimile correspondence is confidential (step S3). If not confidential (if NO in step S3), an ordinary receiving operation is performed.

If the received facsimile correspondence is confidential (if YES in step S3), reference is made to the confidential box number of the received correspondence That is, the control section 1 judges if the confidential box number included in the received facsimile correspondence is the one for the PC transmission function (step S4). If the confidential box number is not for the PC transmission function (in NO in step S4), an ordinary confidential correspondence receiving operation is performed. That is, received image data is stored in the confidential box corresponding to the confidential box number in the image memory 17.

On the other hand, if the confidential box number for the PC transmission function is designated in the received facsimile correspondence (if YES in step 4), the control section 1 sends out the received image data to the interface 10. Thus, the personal computer 15 acquires the image data of the received confidential correspondence.

Figure 3:
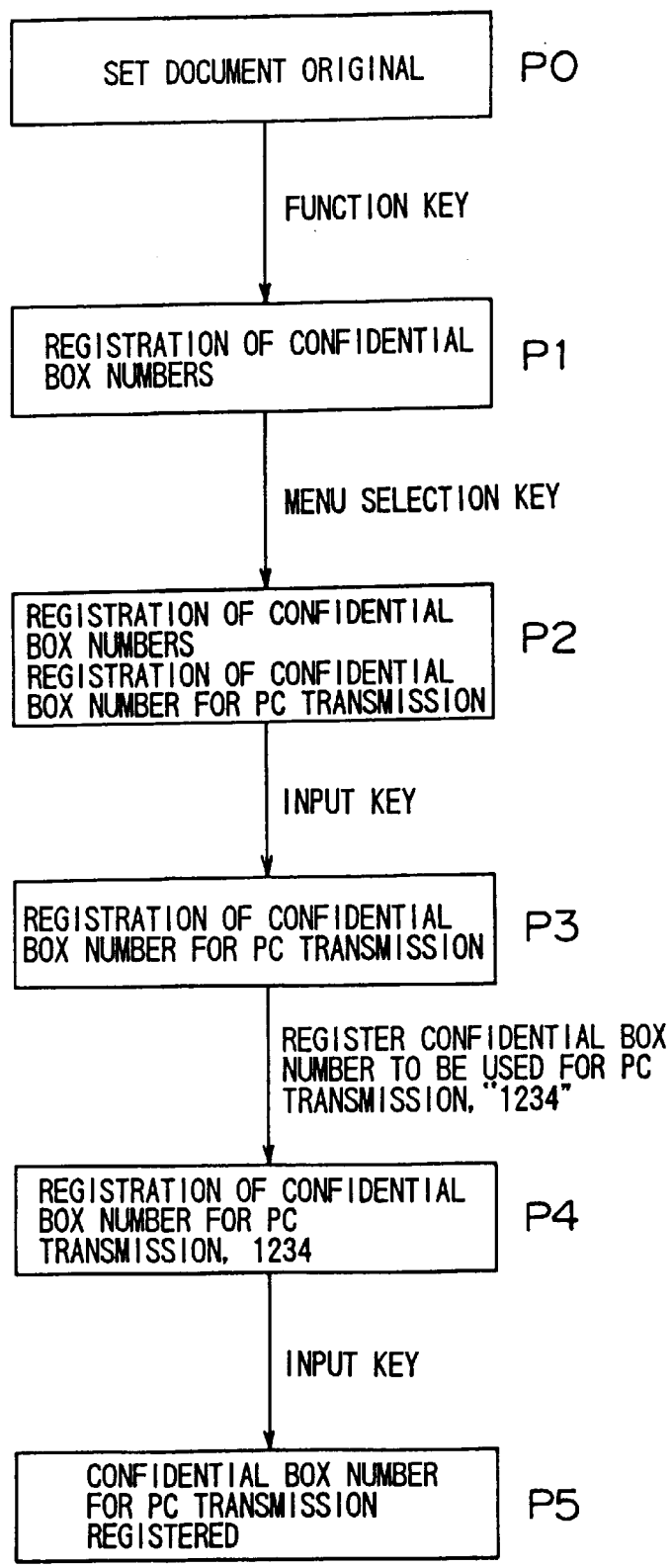
FIG. 3 is a flow chart illustrating display messages successively appearing in a display section of the facsimile apparatus when a confidential box number for PC transmission function is registered.

FIG. 3 is a flow chart illustrating display messages successively appearing in the display section 18 of the facsimile apparatus 20 when a confidential box number for the PC transmission function is registered. When a function key for registering confidential box numbers is operated in a state where an initial screen P0 is displayed which prompts a user to set a document original to be transmitted, a screen P1 appears. In the registration of confidential box numbers, a menu item for registering the aforesaid confidential box number for the PC transmission function can be selected as well as that for registering confidential box numbers for confidential boxes to be formed within the image memory 17 (screen P2).

When an input key is operated in a state where the menu item for the registration of confidential box number for the PC transmission function (screen P2) is displayed, a screen P3 appears which prompts a user to input a confidential box number for PC transmission function. When a desired number which has not been assigned to the confidential boxes already existing in the image memory 17, e.g., a number "1234" for a confidential box "No. 6", is input in this state, a screen P4 appears. When the input key is operated, a message indicating the completion of the registration of the confidential box number for PC transmission function (screen P5) is displayed to complete the registration operation.

In this embodiment, when a confidential correspondence designating the preliminarily registered confidential box number for the PC transmission function is received, information of the received confidential correspondence is automatically sent to the personal computer 15 via the interface 10 even in the ordinary operation mode. Therefore, there is no need for a transmitter to inform a receiver that the transmitter is to transmit information destined for the personal computer 15 and to ask the receiver to switch the operation mode of a recipient facsimile apparatus to the PC-FAX mode. That is, if the transmitter transmits a facsimile confidential correspondence designating the confidential box number for the PC transmission function, information of the transmitted confidential correspondence can be automatically sent to the personal computer 15 upon being received by the facsimile apparatus 20. This will significantly facilitate the operation of the facsimile apparatus having the PC-FAX function.

Further, the PC transmission function can be realized without complicating the communication procedure, because the transmitter can transmit confidential information in substantially the same manner as an ordinary confidential correspondence.

Still further, since a modification in the construction of the facsimile apparatus should be made only in the software portion thereof for the PC transmission function, an increase in cost for the modification of the facsimile apparatus can be avoided.

In a modification of the present invention, a memory area may be allocated to the confidential box corresponding to a confidential box number for the PC transmission function in the image memory 17 so that, if the personal computer 15 is not ready to receive a transmitted facsimile confidential correspondence designating a confidential box number for PC transmission function, information of the received confidential correspondence destined for the personal computer 15 can be stored in the confidential box.

While the present invention has been thus described by way of preferred embodiments, it should be understood that the present invention is not limited to the specifics thereof. For example, though a confidential box number is used as identification information to indicate that the destination of received information is a personal computer in the foregoing embodiment, another control signal included in the facsimile communication procedure can be used as a signal indicative of the identification information.

We claim:

1. A facsimile apparatus for communicating with an external information source, comprising:
    a modem by which the facsimile apparatus communicates with the external information source;
    information output means, apart from said modem, for direct connection to said external information processing apparatus, for providing information received from the external information source to said external information processing apparatus;
    a plurality of information storing areas;
    confidential correspondence controlling means for controlling the received information such that
        the received information is stored in one of said information storing areas designated by content of a confidential correspondence signal added by a user sending the information, when information including the confidential correspondence signal is received, and
        the received information stored in the one information storing area is made available for reading out when a predetermined password is received;
    judging means for judging, when information having the confidential correspondence signal is received, whether the content of the confidential correspondence signal agrees with predetermined particular information, and for generating an agreement signal if the information of the confidential correspondence signal agrees with said predetermined particular information; and
    means for providing the received information to the information output means, independently of said modem, for transmission to said external information processing apparatus in response to the agreement signal, irrespective of a mode of operation of the facsimile apparatus.

2. A facsimile apparatus as set forth in claim 1, wherein said plurality of information storing areas have respective numbers assigned thereto;
    said confidential correspondence signal includes a number; and
    said predetermined particular information includes a number other than the numbers assigned to the information storing areas, so that when the number included in the confidential correspondence signal is one of the respective numbers assigned to the plurality of information storing areas, the received information is stored in the information storing area to which the one of the respective numbers is assigned, and so that when the number included in the confidential correspondence signal is the number other than the numbers assigned to the information storing areas, the received information is sent out to the external information processing apparatus, irrespective of the mode of operation of the facsimile apparatus.

3. A facsimile apparatus as set forth in claim 2, wherein said information output means includes an interface for data communications.

4. A facsimile apparatus as set forth in claim 3, wherein said information output means is capable of connecting with said external information processing apparatus via a communication cable.

5. A facsimile apparatus as set forth in claim 2, wherein the received information is not provided by the information output means to the external information processing apparatus when the predetermined particular information does not correspond to a number matching any of those assigned to any of the information storing areas.

6. A facsimile apparatus as set forth in claim 1, wherein said information output means includes an interface for data communications.

7. A facsimile apparatus as set forth in claim 6, wherein said information output means is capable of connecting with said external information processing apparatus via a communication cable.

8. A facsimile apparatus as set forth in claim 1, wherein said external information processing apparatus is a computer.

9. A facsimile apparatus as set forth in claim 1, wherein the received information is transmitted to the external information processing apparatus when the predetermined particular information is a number among a plurality of stored numbers, the stored numbers other than the predetermined particular information being assigned to the plurality of information storing areas, the received information being stored in one of the information storing areas if the content of the confidential correspondence signal corresponds to one of the stored numbers assigned to the plurality of information storing areas.

10. A method of controlling a facsimile apparatus capable of communicating with an external information source via a modem of the facsimile apparatus to selectively provide received information to an external information processing apparatus to be directly connected to the facsimile apparatus apart from the modem, said method comprising:
    determining if the received information includes a confidential correspondence signal added by a user sending the information;

controlling the received information such that the received information is stored in an information storing area designated by content of any determined confidential correspondence signal;

judging, when information having the confidential correspondence signal is received, whether the content of the confidential correspondence signal agrees with predetermined particular information; and providing the received information to the external information processing apparatus if the information of the confidential correspondence signal agrees with said predetermined information, independently of said modem and irrespective of a mode of operation of the facsimile apparatus.

11. A facsimile apparatus comprising:

an information memory;

means, including a modem, for receiving information transmitted by facsimile communications, the information containing a confidential correspondence signal added by a sender of the information;

judging means for
- judging whether content of the confidential correspondence signal agrees with predetermined particular information,
- generating an agreement signal if the content of the confidential correspondence signal agrees with the predetermined particular information, irrespective of a mode of operation of the facsimile apparatus,
- storing the received information in said information memory if the content of the confidential correspondence signal does not agree with the predetermined particular information, and
- making available the received information for reading out from the information memory if a predetermined password is received;

information output means, apart from said modem and for direct connection to an external information processing apparatus, for providing information received by said information output means to the external information processing apparatus; and means for providing the information, independently of said modem, to the information output means in response to the agreement signal, irrespective of the mode of operation of the facsimile apparatus.

12. A facsimile apparatus as set forth in claim 11, further comprising an assignment memory for storing a set of assignment numbers and the predetermined particular information different than the assignment numbers of the set, wherein the information memory has a plurality of information storing areas having respective numbers assigned thereto, the assigned numbers being selected from among the assignment numbers of the set, said control means being responsive to the confidential correspondence signal when the content thereof agrees with one of the assignment numbers of the set, to store the received information in the information storing area to which the one of the assignment numbers is assigned.

13. A facsimile apparatus as set forth in claim 11, wherein the predetermined particular information is a number among a plurality of stored numbers, the stored numbers other than the predetermined particular information being assigned to the plurality of information storing areas, the received information being stored in one of the information storing areas if the content of the confidential correspondence signal corresponds to one of the stored numbers assigned to the plurality of information storing areas.

14. A facsimile apparatus according to claim 11, wherein said information output means includes an RS 232C interface port.

* * * * *

UNITED STATES PATENT AND TRADEMARK OFFICE
CERTIFICATE OF CORRECTION

PATENT NO. : 5,909,289

DATED : June 1, 1999

INVENTOR(S) : Koichi Shibata, et al.

It is certified that error appears in the above-identified patent and that said Letters Patent is hereby corrected as shown below:

Column 5, line 43, change "said" to --an--.

Signed and Sealed this

Second Day of November, 1999

Attest:

Q. TODD DICKINSON

Attesting Officer

Acting Commissioner of Patents and Trademarks